(12) United States Patent
Schorn-Gilson

(10) Patent No.: US 6,168,211 B1
(45) Date of Patent: Jan. 2, 2001

(54) THREADED CONNECTION WITH SUPPORTING RING

(75) Inventor: Alfons Schorn-Gilson, Swisttal (DE)

(73) Assignee: Walterscheid Rohrverbindungstechnik GmbH, Lohmar (DE)

(*) Notice: Under 35 U.S.C. 154(b), the term of this patent shall be extended for 0 days.

(21) Appl. No.: 09/162,877

(22) Filed: Sep. 29, 1998

(30) Foreign Application Priority Data

Sep. 29, 1997 (DE) ............................................... 197 42 917

(51) Int. Cl.$^7$ .................................................... F16L 17/00
(52) U.S. Cl. ...................... 285/348; 285/354; 285/334.5; 285/339
(58) Field of Search ................................ 285/334, 334.5, 285/339, 342, 343, 382.7, 348

(56) References Cited

U.S. PATENT DOCUMENTS

| | | | |
|---|---|---|---|
| 1,858,136 | * 5/1932 | Brenner | 285/334.5 |
| 2,150,524 | * 3/1939 | Starr | 285/334.5 |
| 2,463,883 | * 3/1949 | Kinsey | 285/334.5 |
| 2,599,389 | 6/1952 | Hume . | |
| 2,685,461 | * 8/1954 | Mueller | 285/334.5 |
| 4,671,545 | * 6/1987 | Miyazaki | 285/334.5 |
| 5,893,591 | * 4/1999 | Ebel et al. | 285/334.5 |
| 5,961,160 | * 10/1999 | Frohlich | 285/354 |

FOREIGN PATENT DOCUMENTS

| | | | |
|---|---|---|---|
| 2817438 | * 10/1979 | (DE) | 285/334.5 |
| 40 38 539 | 4/1992 | (DE) . | |
| 195 11 063 A1 | 11/1995 | (DE) . | |
| 195 41 622 | 2/1997 | (DE) . | |
| 196 37 129 | 5/1997 | (DE) . | |
| 197 21 179 | 10/1998 | (DE) . | |
| 0 366 789 A1 | 5/1990 | (EP) . | |
| 0 593 325 B1 | 4/1994 | (EP) . | |
| 453217 | 3/1936 | (GB) . | |
| 852578 | 10/1960 | (GB) . | |
| 2077379 | 12/1981 | (GB) . | |
| 97/07356 | * 2/1997 | (WO) | 285/354 |

* cited by examiner

*Primary Examiner*—Eric K. Nicholson
(74) *Attorney, Agent, or Firm*—Harness, Dickey & Pierce, P.L.C.

(57) ABSTRACT

A threaded connection for easily deformable thin-walled pipes (20) has a connecting member (1) with a cylindrical receiving bore (5) accommodating the pipe (20) and an outer thread (7). A nut (8) is provided with an inner thread (10) which is threaded onto the outer thread (7). The nut (8) has a through-bore (11) for the pipe (20) and a conical bore (13) which widens towards the connecting member (1). The pipe (20), at a distance from its end face (21), has a bulge (23) which is held in a clamped-in condition between the conical bore (13) and a conical supporting face (18) of a separate supporting ring (14). To limit the tightening movement, the supporting ring (14) has a stop face (19) against which the conical bore (13) comes to rest when the nut (8) is tightened. A holding face (17) on the supporting ring (14) is supported against the end face (3) of the connecting member (1). This design achieves advantageous supporting conditions, with the process of tightening the nut (8) remaining unaffected by the radial forces resulting from the axial tensioning force.

10 Claims, 3 Drawing Sheets

THREADED CONNECTION WITH SUPPORTING RING

CROSS-REFERENCE TO RELATED APPLICATIONS

This application claims priority upon German application 197 42 917.3 filed Sep. 29, 1997, which is incorporated herein by reference.

BACKGROUND OF THE INVENTION

The present invention relates to threaded connections for metallic pipes.

EP 0 366 789 A1 describes a threaded connection with a connecting member which, towards the nut, is provided with a recess to receive a sealing ring. First, starting from the through-bore of the nut through which the pipe extends, a conical bore is provided which ends in a radially extending face in the bore of the nut. The radially extending face serves as a stop face. When the nut is fully tightened, said stop face comes into contact with the end face of the connecting member. Due to the sealing ring, only a small supporting face is at the connecting member for the associated contact face of a pipe bulge. The pipe bulge is delimited by two conical faces which abut one another by means of their greatest diameters. The further contact face of the bulge cooperates with the conical bore of the nut. The bulge is produced in a device which comprises resilient elements which partially widen the pipe and bring the pipe into contact with a contour. One of the contours is formed by the conical bore of the nut and the other one by a tool. The problem with the above-described assembly is that the tolerance conditions do not allow the pipe to be securely held. Furthermore, in the case where final tightening causes a deformation in the region of the bulge of the pipe, there is a risk that the connecting member is severely loaded in the radial direction. Thus, movement of the nut has an adverse effect on its inner threads as well as on the outer threads of the connecting member. Without the associated spring disc it is practically impossible to see whether the connection is tightened. The solution according to the state of the art is additionally disadvantageous in that standardized parts can neither be used for the connecting member nor for the nuts.

EP 0 593 325 B1 describes a threaded connection where the pipe has a formation which comprises two conical faces extending at different angles. The publication deals with a threaded-in connection where a member is provided with a bore comprising a conically tapered bore which follows a radially extending end face and changes into a cylindrical bore. Furthermore, the bore comprises a threaded portion which is arranged at a distance from the radially extending end face. Into the bore, it is possible to thread a hollow screw which, towards its end face, is provided with a conical bore. The hollow screw, by means of an annular edge formed between its end face at its end entering the bore and the conical bore, comes to rest against a conical face of the bulge of the pipe. Furthermore, between the end face of the bore and the further conical face, a supporting ring is arranged which is radially received without being guided in the bore. The support ring has a first conical face against which the pipe is supported. The supporting ring has a conically extending bore which complements the conical bore of the receiving member and extends in the opposite direction. Between the two conical bores and the outer face of the pipe, an annular receiving space is formed to receive a sealing ring. The supporting ring and the hollow screw do not come into contact with one another. The disadvantage of this embodiment is that the pipe, in the region of its bulge, is subjected to high loads. Thus, there is a risk of the pipe becoming deformed, because the tightening movement is practically unlimited.

DE 195 41 622 A1 describes a threaded connection having a connecting member, a supporting ring and a nut for a pipe with a bulge. The connecting member has a conical bore which starts and is tapered from an end face. The supporting ring is supported against the end face by a radial face. Furthermore, between the supporting ring and the end face, a first sealing element is accommodated in a recess of the supporting ring. The supporting ring is provided with an inner conical face which starts from the supporting ring end facing away from the radial face. The conical face is tapered towards the connecting member. The nut has a conical bore which extends in the opposite direction. Between the conical bore and the inner conical bore, the formation of the pipe is held by corresponding conical faces.

SUMMARY OF THE INVENTION

It is an object of the present invention to provided a threaded connection which ensures that the metallic pipe is securely held by the components associated with the threaded connection. Furthermore, it is an object to prevent the forces resulting from axial tensioning from overloading the pipe in its clamping region.

In accordance with the invention, a threaded connection for metal pipes has a connecting member with an outer thread and a cylindrical receiving bore into which the pipe projects. A nut is provided with an inner thread which matches the outer thread. The nut includes a through-bore through which the pipe extends through to enter the receiving bore. A conical bore, which widens towards the connecting member, is adjacent the through-bore in the nut. A bulge is formed on the outer wall of the pipe at a distance from its end face extending into the receiving bore. The bulge has a first contact face and a second contact face. The second face adjoins the first face at the greatest diameter of the bulge and extends in the opposite direction to the first contact face. The second contact face is received between two inner conical faces which form an annular receiving space for the bulge. One of the two inner conical faces forms a supporting face which is formed by a part of a separate supporting ring. The other one of the two inner conical faces is formed either by the conical bore of the connecting member or by the conical bore of the nut. The supporting ring includes a conical stop face to support the nut with its conical bore in the tightened condition. A holding face extends radially relative to the longitudinal axis and provides support against an end face of the connecting member. A sealing ring is arranged in an annular receiving space defined between the supporting ring, the pipe and the connecting member or between the pipe and the conical bore.

A special advantage is gained by limiting the tightening movement. When the conical bore of the nut, after the nut has been fully tightened, stops against the stop face of the supporting ring, the receiving space between the conical bore of the nut and the conical bore of the connecting member and the conical supporting face of the supporting ring cannot be reduced any further. In consequence, the bulge of the pipe cannot be overloaded. Even relatively easily deformable pipes, for example those made of an easily deformable material such as copper, or thin-walled pipes, are held in the threaded connection such that a secure and leak-proof connection is achieved. A further advantage exists in that the connection can be replaced in existing equipment/plant because the normally used standardized nuts and connecting members (DIN) can continue to be used. By supporting the nut on the supporting ring, the forces acting in the direction of rotation are either reduced or not transferred to the bulge. Thus, practically no torque is introduced into the pipe when tightening the connection.

It is also advantageous, in one embodiment, that the bulge is supported on the supporting face of the supporting ring in a region remote from the inner thread of the nut and the outer thread of the connecting member. Thus, when radial forces occur, the conditions of movement of the thread are not influenced. As the angles of the conical bore and of the supporting face and stop face are identical, it is possible to achieve balanced conditions during the tightening process. Thus, it is practically impossible for the supporting ring to be expanded in the region axially corresponding to the conical bore of the nut and the supporting face. By providing a separate supporting ring, it is possible to achieve substantially constant tightening conditions. The seal ensures a sealing effect even at high pressures.

In a first embodiment, the receiving space is delimited by the conical bore of the connecting member. The conical bore starts from the end face supporting the supporting ring and is tapered towards the receiving bore. Also, the space is limited by the bore-shaped supporting face of the supporting ring, which supporting face is conically tapered in the opposite direction. Thus, an additionally metallic seal is provided between the pipe and the connecting member.

In a further embodiment, the receiving space is delimited by the nut conical bore, which widens towards the connecting member, and by the bore-shaped supporting face. The bore-shaped supporting face is conically tapered in the opposite direction. Also, the bore-shaped supporting face starts from the end of the supporting ring which has the stop face for the conical bore of the nut.

According to a further embodiment, the receiving bore of the connecting member has a shoulder to support the pipe on its end face. The length of the pipe which projects beyond the bulge is dimensioned such that, during tightening, the end face is pressed against the shoulder. If, as a result of tolerances, the projecting length is too long, this does not adversely affect the shape of the bulge, so that secure holding conditions are ensured. Under certain circumstances, the pipe may be slightly drawn in between the bulge and the end face.

In a first variant, the annular receiving space is delimited by the outer face of the pipe extending into the receiving bore by a recess in the holding face of the supporting ring and by the end face of the connecting member. In the case of this solution, it is particularly advantageous that it is not only the nut which is a standardized component, but also the connecting member. The connecting member is a conventional threaded member with a conical bore of twenty-four (24°) degrees. It is thus possible to use standard threading means to advantageously clamp thin-walled pipes made from a relatively easily deformable material.

In a further variant of the embodiment of the annular receiving space, the annular receiving space is delimited by the outer face of the pipe extending into the receiving bore, by the holding face of the supporting ring and by a conical bore of the connecting member.

In yet a further variant, the supporting ring has a projection which projects beyond the holding face. The projection extends into a bore of the connecting member. The bore is conically tapered from the conical bore of the nut. The projection rests against the wall of connecting member. The annular receiving space for the seal is formed by the conical bore of the connecting member, the outer face of the pipe and by the end face of the projection associated with the supporting ring. The projection provides additional radial support for the supporting ring and encloses the sealing ring inside the conical bore of the connecting member. Advantageous supporting conditions in the radial direction are also obtained if the supporting ring is guided on its outer face in the bore of the nut.

To ensure that the connection is assembled securely, the sealing ring is connected to the supporting ring. This can be effected by vulcanizing or gluing the sealing ring to the metallic supporting ring. In this way, the sealing ring cannot be lost. According to a further embodiment, the sealing ring, in the unassembled condition, leaves free an aperture which is smaller than the diameter of the outer face of the pipe. In this way, it is possible to bridge even larger tolerances in the outer diameter of the pipe.

From the following detailed description, taken in conjunction with the accompanying drawings and subjoined claims, other objects and advantages of the present invention will become apparent to those skilled in the art.

BRIEF DESCRIPTION OF THE DRAWINGS

Five preferred embodiments of the invention are diagrammatically illustrated in the drawing and explained in greater detail with reference to the following drawings.

DETAILED DESCRIPTION OF THE PREFERRED EMBODIMENT

Figure 1:
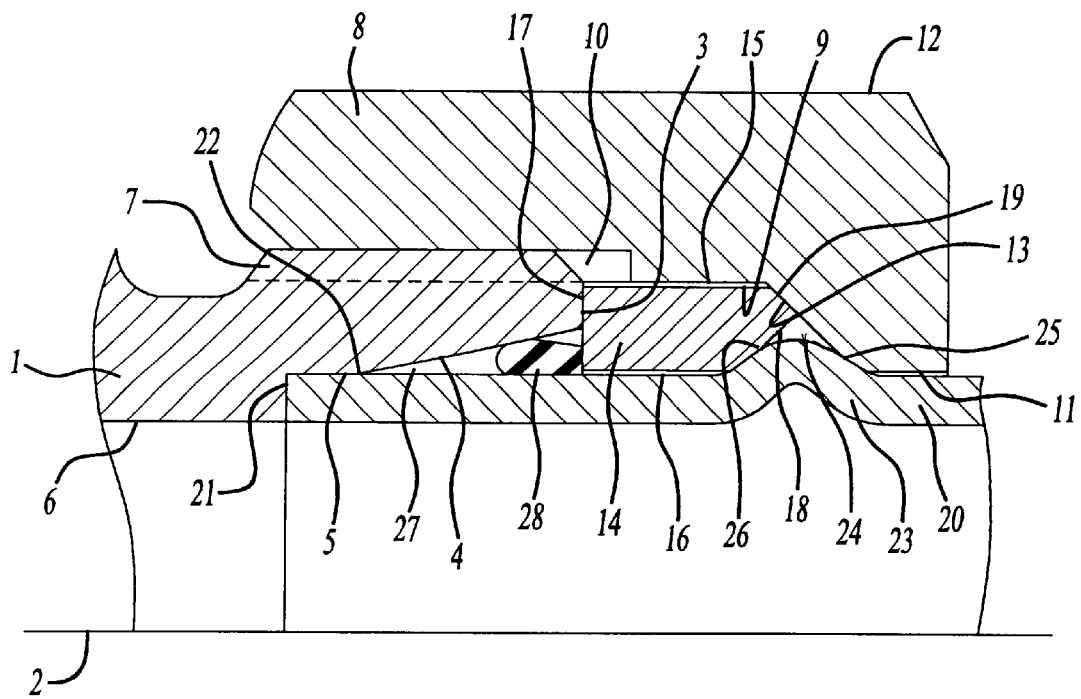
FIG. 1 is a cross-section view of a first embodiment using both a nut and a connecting member.

FIG. 1 illustrates a longitudinal section. The connecting member 1 defines a longitudinal axis 2 which extends perpendicular to an end face 3 of the connecting member 1. Starting from the end face 3, the connecting member 1 includes a tapered conical bore 4. Thus, the greatest diameter of the conical bore 4 is positioned in the region of the end face 3. The other end of the conical bore 4, with the reduced diameter, is followed by a cylindrical receiving bore 5. Both the conical bore 4 and the receiving bore 5 are centered on the longitudinal axis 2. The receiving bore 5 ends at a stepped face in a connecting bore 6. The connecting bore 6, in its entirety, extends through the connecting member 1. The latter may be symmetric, for example, in which case there exists a mirror axis which extends at a right angle relative to the longitudinal axis 2. This means that, for example, the left-hand end (not illustrated) of the connecting member 1 is identical to the right-hand end, as shown here, to enable both ends to be connected to one another by the connecting bore 6 to allow the passage of a flowing medium. On its outer face, the connecting member 1 is provided with an outer thread 7 and, if required, with a key face (not illustrated) to allow the engagement of a tool.

In the assembled condition as illustrated, nut 8, by means of the inner thread 10 in its bore 9, is threaded onto the outer thread 7. At one end, the nut 8 is provided with a through-bore 11. The nut 8, on its outside, is provided with a key face 12 to allow the engagement of a spanner or wrench. The through-bore 11 is also centered on the longitudinal axis 2. A conical bore 13 follows the through-bore 11. The conical bore 13 widens conically towards the connecting member 1 and ends in a cylindrical bore 9.

A supporting ring 14 is received between the connecting member 1 and the nut 8. The supporting ring 14 has a cylindrical outer face 15 which guides it in the bore 9 of the nut 8. Furthermore, the supporting ring 14 has a cylindrical bore 16 which is also centered on the longitudinal axis 2. In addition, the supporting ring 14 includes a holding face 17. The holding face 17 is supported against the end face 3 of the connecting member 1. The holding face 17 extends radially relative to the longitudinal axis 2. The supporting ring 14, at its end facing the conical bore 13 of the nut, comprises a conical stop face 19. The cone angle of the conical stop face 19 corresponds to that of the conical bore 13 of the nut 8. When fully tightened, the nut 8, via its conical bore 13, comes to rest against the conical stop face 19. Thus, the supporting ring 14 is clamped between the nut 8 and the connecting member 1. Furthermore, the supporting ring 14, towards the conical bore 13 of the nut 8, comprises a conical supporting face 18 which extends in the direction opposite to that of the conical bore 13. Thus, between the supporting ring and nut 8, a receiving space 24 is formed which has a triangular cross-section and extends around the longitudinal axis 2.

The pipe 20 is guided through the through-bore 11 of the nut 8. The pipe end face 21 is positioned in the receiving bore 5 of the connecting member 1. The cylindrical pipe outer face 22 projects into the receiving bore 5. At a distance from the end face 21, the pipe 20 has a bulge 23. The bulge is produced by partially outwardly widening the pipe wall. Two at least partially conical contact faces 25, 26 are formed on the bulge and extend in opposite directions. When the nut 8 is tightened, the first contact face 25 serves to support the conical bore 13 of the nut 8. The second contact face 26 comes to rest against the conical supporting face 18 of the supporting ring 14. The bulge 23 is dimensioned such that, prior to the nut being tightened, the bulge 23 is larger than the receiving space 24. Thus, as the nut 8 is moved into a firmly tightened condition, the pipe 20 in the region of the bulge 23 experiences a change in shape. This method ensures a film and form-fitting type of clamping, so that even vibrations cannot loosen the connection.

To achieve complete sealing, a soft seal in the form of a sealing ring 28 is arranged in an annular receiving space 27 formed between the conical bore 4 of the connecting member 1, the holding face 17 of the supporting ring 14, and the outer face 22 of the pipe 20.

Figure 2:
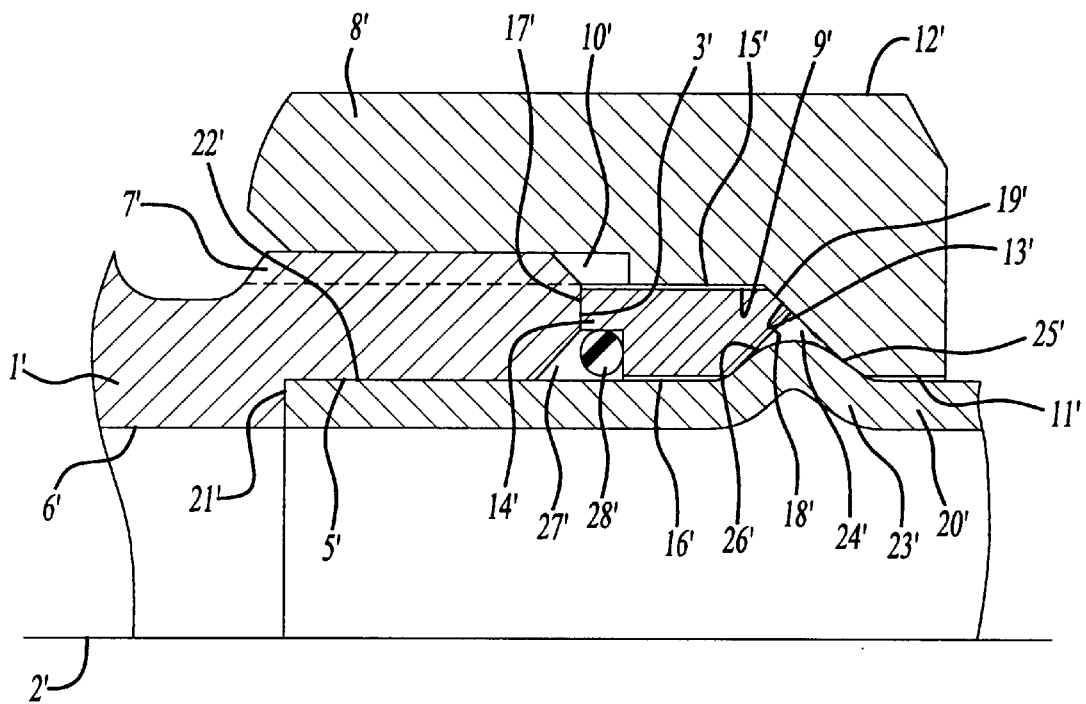
FIG. 2 is a longitudinal section view through a second embodiment where the connecting member deviates from the embodiment according to FIG. 1.

The embodiment of the threaded connection according to FIG. 2 substantially corresponds to that of FIG. 1 regarding the arrangement and design of the nut 8', the supporting ring 14' and the way in which the pipe 20' with the bulge 23' is held. However, both embodiments differ with respect of the arrangement of the soft seal.

The connecting member 1' has an outer thread 7' and a connecting bore 6'. However, from the end face 3', which is also positioned perpendicularly to the longitudinal axis 2', only a cylindrical receiving bore 5' is present. The nut 8' provided with the inner thread 10' in the bore 9' is also threaded onto the connecting member 1'. The nut 8' is shown in the tensioned condition reached at the end of the tightening path. On its outer face, the nut 8' has a key face 12' to allow engagement of a tool 10. The nut 8', at its end facing away from the inner thread 10', has a through-bore 11' which is followed by a conical bore 13'. The conical bore 13' widens conically towards the connecting member 1' and ends with its greatest diameter in the bore 9'.

The supporting ring 14', via its outer face 15', is received in the bore 9' of the nut 8' and has a cylindrical bore 16'. A holding face 17' extends radially relative to the longitudinal axis 2' and extends radially relative to the longitudinal axis 2' and is supported against the end face 3' of the connecting member 1'. At its end face facing away from the holding face 17', the supporting ring 14' has a conical stop face 19'. The cone angle of the conical stop face 19' corresponds to that of the conical bore 13'. The nut 8' rests against the face 19' when tightened relative to the conical bore 13'. The supporting ring 14' also has a supporting face 18' in the form of a conical bore whose cone angle corresponds to that of the conical bore 13' of the nut 8'.

The pipe 20' passes through nut through-bore 11'. The pipe end face 21' projects as far as the end of the receiving bore 5' in which it is guided by means of its outer face 22'. The pipe 20' is also provided with a bulge 23'. The bulge 23' has a first contact face 25' and a second contact face 26'. The contact surfaces extend at least partially conically in accordance with the conical bore 13' of the nut 8' and the supporting face 18' of the supporting ring 14'. To achieve precision sealing between the holding face 17' and the bore 16' of the supporting ring 14', a recess 29 is provided which, together with the outer face 22' of the pipe 20' and the end face 3' of the connecting member 1', delimit an annular receiving space 27' for a sealing ring 28'. The conical bore 13' of the nut 8' and the supporting face 18' extend in the opposite direction from a receiving space 24' around the longitudinal axis 2'. The receiving space 24' receives the bulge 23' of the pipe 20' in order to hold the bulge in a tensioned condition.

Figure 3:
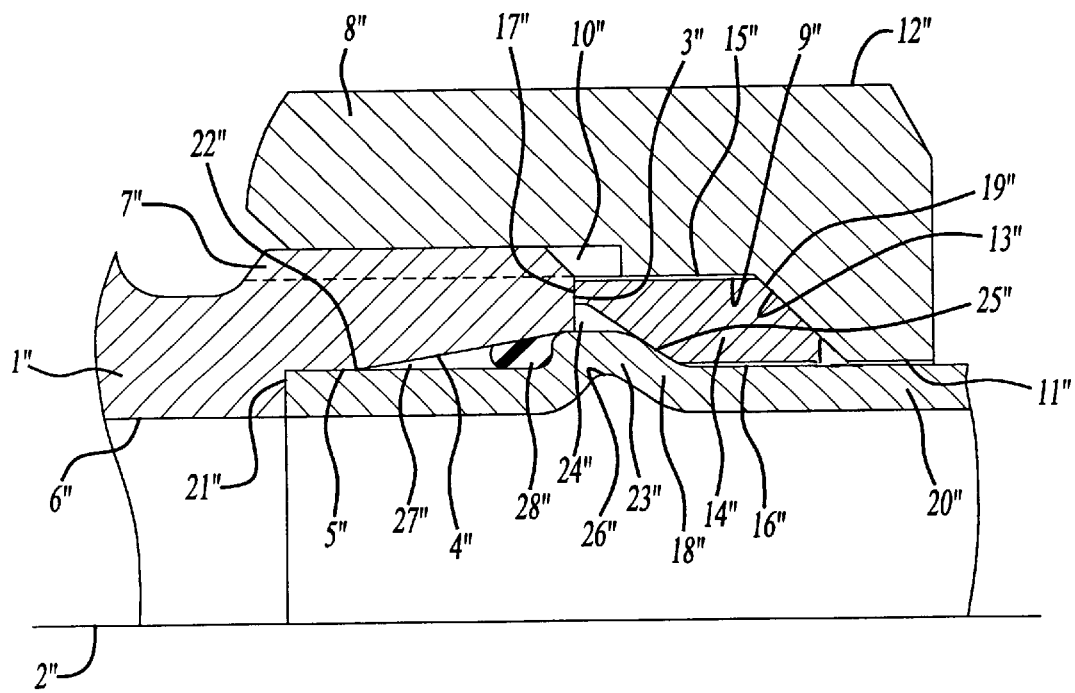
FIG. 3 is a longitudinal section view through a further embodiment where the receiving space for the bulge of the pipe is delimited.

FIG. 3 shows a further embodiment of the inventive threaded connection. The connecting member 1" defines the longitudinal axis 2". A conical bore 4" starts from the end face 3" and is tapered towards the cylindrical receiving bore 5". The receiving bore 5" changes, via a step, into the connecting bore 6". Furthermore, the connecting member 1" is provided with an outer thread 7" which is threaded with the nut 8".

The nut 8" has a bore 9" with an inner thread 10". The inner thread 10" mates with the outer thread 7". At the end remote from the connecting member 1", the nut 8" has a through bore 11" centered on the longitudinal axis 2". The nut 8" on its outer face has a key face 12" to enable engagement of a tool in order to tighten the connection. A conical bore 13" starts with its small diameter at the through bore 11' and widens toward the bore 9".

A supporting ring 14" is arranged between the end face 3" of the connecting member 1" and the conical bore 13". The outer face 15" of the supporting ring 14" is held in the bore 9". The supporting ring 14" has a bore 16" which is positioned on the pipe 20". The supporting ring 14" also includes a stop face 19" against which nut 8" is supported by the conical bore 13". A holding face 17" of the supporting ring 14" is pressed into contact with the end face 3" of the connecting member 1" by tightening nut 8". The supporting ring 14" has a supporting face 18", in the form of a conical bore, which starts from the holding face 17" and which is tapered in the direction away from the connecting member 1".

The pipe 20" extends through the through-bore 11" of the nut 8" into the receiving bore 5". The end face 21" of the pipe 20" is supported against the shoulder between the receiving bore 5" and the connecting bore 6". The end face 21" is held in a tightened condition in contact with said shoulder face. A bulge 23" is loaded by the supporting face 18" of the supporting ring 14". The bulge 23" is provided with a first contact face 25" and a second contact face 26". The contact face 26" is tapered in the opposite direction of face 25" and is pressed into contact with the conical bore 4" of the connecting member 1". A receiving space 24" for the bulge 23" is formed between the conical bore 4" and the supporting face 18". The space 24" extends in the opposite direction and has a conical shape.

A receiving space 27" is formed in the space between the outer face 23". A soft seal in the form of a sealing ring 28" is arranged in the receiving space 27". Thus, the soft seal, in addition to the metallic seal, achieve precision sealing between the second contact face 26" and the conical bore 4".

Figure 4:
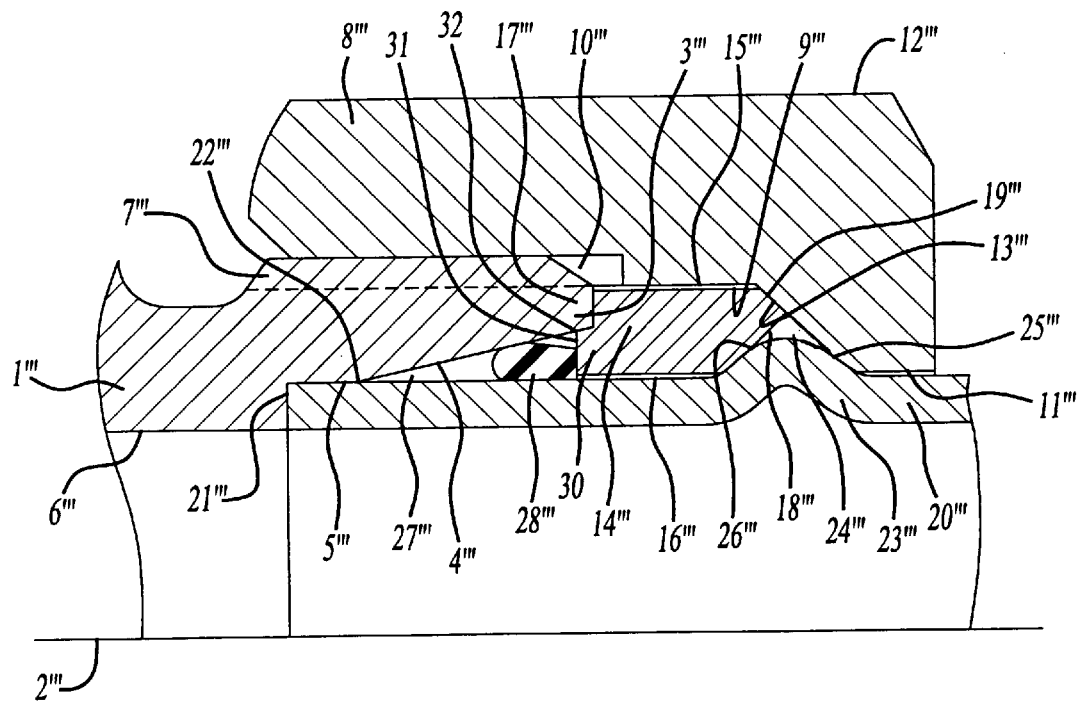
FIG. 4 is a longitudinal section view through a fourth embodiment whose supporting ring deviates from that shown in FIG. 1.

FIG. 4 shows an embodiment which is modified as compared to FIG. 1. In respect of design, the connecting member 1''', the nut 8''' and the pipe 20''' with the bulge 23''' correspond to those shown in FIG. 1. The supporting ring 14''' also has a holding face 17''' which is supported against the end face 3''' of the connecting member 1'''. The connecting member has a stop face 19''' against which the nut 8''' is supported by its conical bore 13''' in a tightened condition.

The supporting ring 14''' deviates from FIG. 1 in that it additionally includes projection 30 which projects beyond the holding face 17''' of the supporting ring 14''' towards the connecting member 1'''. The projection 30 extends into the conical bore 4''' of the connecting member 1''' and is supported on the wall by the conical outer face 32. The receiving space 27''' for receiving the sealing ring 28''' is delimited by the outer face 22''' of the pipe 20''' by the conical bore 4''' of the connecting member 1''' and by the end face 31 of the projection 30 associated with the supporting ring 14'''. The projection 30 radially supports the supporting ring 14'''. This is the reason why the support ring 14''' is not guided by its outer face 15''' in the bore 9''' of the nut 8'''.

As the design of the remaining parts corresponds to that of FIG. 1, the additional reference numbers referring to those parts were provided with three apostrophes each. As far as the description is concerned, additional reference is made to FIG. 1 wherein the same components are explained.

Figure 5:
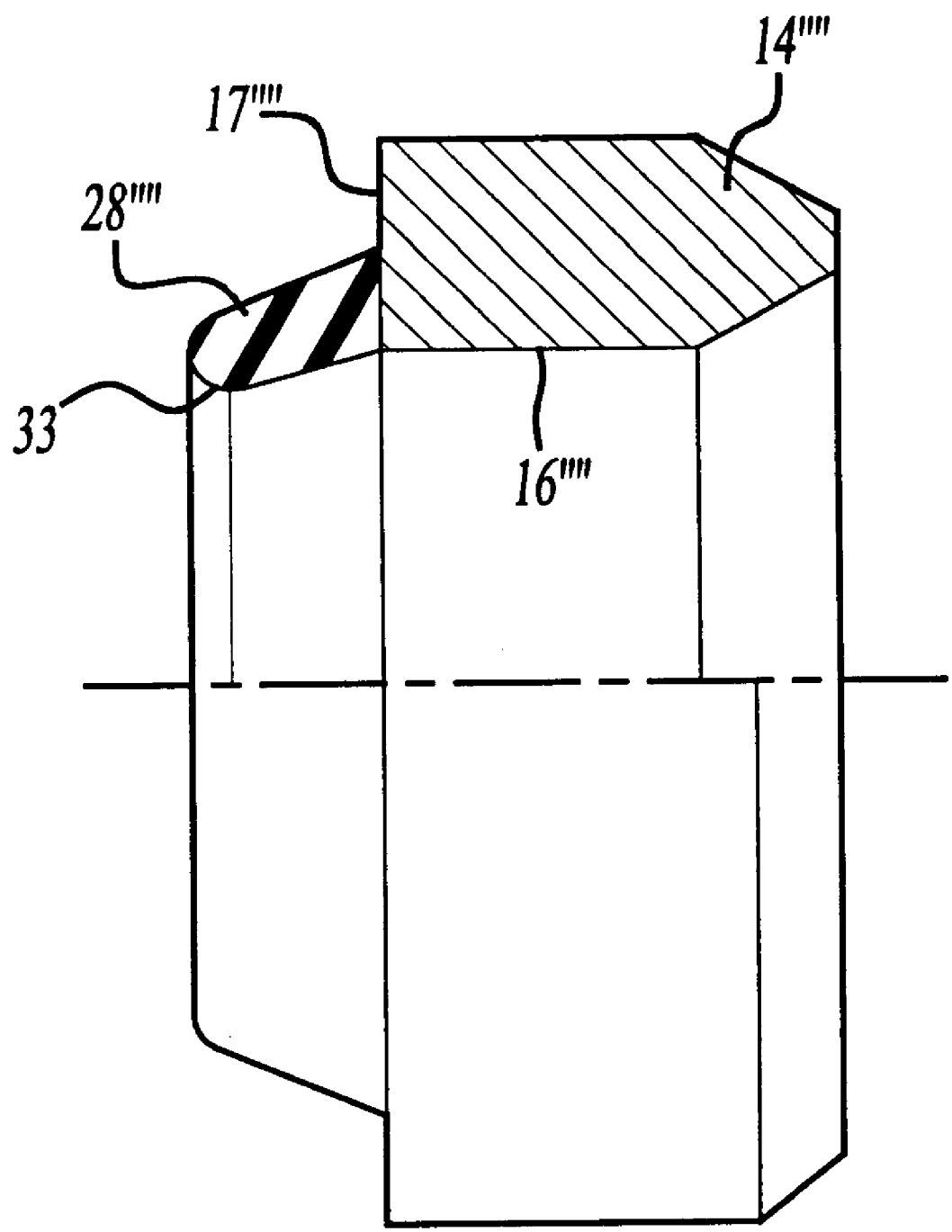
FIG. 5 is a partial cross-section view of a supporting ring with a sealing ring.

FIG. 5 shows a supporting ring 14'''' in an enlarged scale in the form of an individual part with a sealing ring 28''''. The sealing ring 28'''' on its radial inside is vulcanized or glued to the holding face 17'''' of the supporting ring 14''''. The sealing ring 28'''' extends from the holding face 17''''. The wall thickness of the sealing ring decreases only slightly, but with the diameter decreasing overall. Thus, the sealing ring 28'''', at its free end, leaves open an aperture whose diameter is clearly smaller than the outer diameter of the pipe to be guided through or than the diameter of the bore 16'''' of the supporting ring 14''''.

While the above detailed description describes the preferred embodiment of the present invention, the invention is susceptible to modification, variation and alteration without deviating from the scope and fair meaning of the subjoined claims.

What is claimed is:

1. A threaded connection for connecting a metal pipe having a bulge formed out of the wall of the pipe at a distance from its end face which extends into a receiving bore, said bulge having a first contact face and a second contact face adjoined at a greatest diameter of said bulge, said first and second contact faces extending in opposite directions, comprising:

a connecting member having an outer thread and a cylindrical receiving bore into which the pipe projects;

a nut provided with an inner thread which mates the outer thread, a through bore in said nut through which the pipe extends to enter the receiving bore, and a conical bore in said nut which widens towards the connecting member and which follows the through-bore;

a separate supporting ring received between said connecting member and said nut, including an inner conical supporting face and a conical stop face, said conical stop face for supporting said nut with its conical bore in the tightened condition, and said supporting ring further including a holding face extending radially relative to a longitudinal axis and being supported against an end face of the connecting member, said supporting face of said supporting ring and said conical bore of said nut or said supporting face of said supporting ring and a conical bore of said connecting member forming a space for receiving said bulge with its first and second contact faces, and comprising a sealing ring arranged in an annular receiving space defined between the supporting ring, the pipe and the connecting member or between the pipe and the conical bore of the connecting member.

2. A threaded connection according to claim 1, wherein said receiving space is delimited by the conical bore of the connecting member, said conical bore starting from the end face supporting the supporting ring, said bore tapered toward the receiving bore and delimited by a bore-shaped supporting face of the supporting ring, said supporting face being conically tapered in the opposite direction.

3. A threaded connection according to claim 1, wherein said receiving space being delimited by the nut conical bore which widens towards the connecting member and by the bore-shaped supporting face which is conically tapered in the opposite direction, and said supporting ring having a stop face for the conical bore of the nut.

4. A threaded connection according to claim 1, wherein said receiving bore of the connecting member has a shoulder for supporting the pipe on its end face.

5. A threaded connection according to claim 1, wherein said annular receiving space is delimited by the outer face of the pipe extending into the connecting member receiving bore by a recess in the holding face of the supporting ring and by the end face of the connecting member.

6. A threaded connection according to claim 1, wherein said annular receiving space is delimited by the outer face of the pipe extending into the connecting member receiving bore by the holding face of the supporting ring and by a conical bore of the connecting member.

7. A threaded connection according to claim 1, wherein said supporting ring including a projection which projects beyond the holding face and extends into a bore of the connecting member, said connecting member bore is conically tapered from the conical bore of the nut and said projection rests against the wall of said connecting member and said annular receiving space for the seal is formed by the conical bore of the connecting member by the outer face of the pipe and by the end face of the projection associated with the supporting ring.

8. A threaded connection according to claim 1, wherein said supporting ring is guided on its outer face in the bore of the nut.

9. A threaded connection according to claim 1, wherein said sealing ring is connected to the supporting ring.

10. A threaded connection according to claim 9, wherein in an assembled condition, said sealing ring leaves free an aperture which is smaller than the diameter of the outer face of the pipe.

* * * * *